(No Model.)
F. W. WRIGHT
CAN OPENER.
No. 528,582.  Patented Nov. 6, 1894.
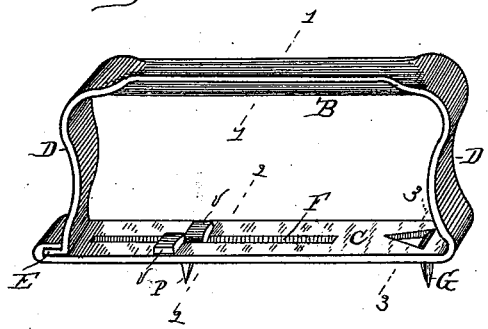
Fig. 1.
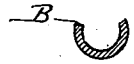 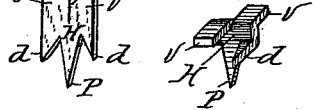 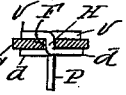 
Fig. 4.  Fig. 2.  Fig. 3.  Fig. 5.  Fig. 6.
Witnesses
W. C. Hutchins.
J. F. L. Casey.
Inventor
Frank W. Wright.
By his Attorney
Wm. J. Hutchins.

UNITED STATES PATENT OFFICE.

FRANK W. WRIGHT, OF WICHITA, KANSAS.

CAN-OPENER.

SPECIFICATION forming part of Letters Patent No. 528,582, dated November 6, 1894.

Application filed May 4, 1894. Serial No. 510,037. (No model.)

*To all whom it may concern:*

Be it known that I, FRANK W. WRIGHT, a citizen of the United States of America, residing at Wichita, in the county of Sedgwick and State of Kansas, have invented certain new and useful Improvements in Can-Openers, of which the following is a specification, reference being had therein to the accompanying drawings and the letters of reference thereon, forming a part of this specification, in which—

Figure 1, is a perspective view of the implement; Figs. 2 and 3, detail views of the adjustable center prod piece of the implement; Fig. 4, a cross-sectional view of the handle portion of the implement on line 1—1 of Fig. 1; Fig. 5, a similar view on line 2—2 of said Fig. 1, looking toward the left, and Fig. 6, a similar view on line 3—3 of said Fig. 1, looking toward the right.

This invention relates to certain improvements in an implement for opening tin cans of the class commonly known as can openers; and consists in certain novel structural features and arrangement of parts; which improvements are fully set forth and explained in the following specification and pointed out in the claim.

The object of this invention is, to produce a simple and inexpensive steel can opening implement, adapted to cut regular circular openings in a can, and adjustable to any desired radius, within the limits of the implement, without the aid of set screws or the like.

Referring to the drawings B represents the implement handle portion and C the cutter and center point holding bar of the implement, which bar portion is connected with the handle portion, at each end through the agency of arm sections D, D; the whole viz: said handle portion, bar portion and arm portions being made from a single flat strip of steel, shaped as shown; with the ends secured together as shown at E in Fig. 1, wherein the terminal of one arm D is bent laterally to form a foot piece, and the end of bar portion C is bent up and over to clamp, or clasp, said foot piece of the arm, and thereby said union is effected without the aid of other parts. Said bar portion C is made with a longitudinal slot F, formed by punching a section of metal therefrom, which slot extends from one end of said bar portion to a point a little distant from the opposite end thereof, and G represents the cutter blade of the implement formed by punching a V shaped section from the unslotted end portion of said bar section, as shown, said blade being properly shaped to form a cutting edge by grinding, or otherwise, and when formed extends perpendicularly from the said bar portion C.

H represents the center point section and is made by being cut from a flat piece of steel, and is shaped with the slit $a$ extending down its upper central portion; with the two lower side prongs $d$, and with the lower central downwardly extending point P. Said section thus shaped is placed bodily in slot F when the top, or upper sections V, V thereof, at either side of slit $a$, are bent over upon the bar portion C; one section in one direction and the other section in the reverse direction. Also the prongs $d$ are similarly bent against the under side of said bar, and by thus bending said sections V, V, and prongs $d\ d$, the section H is secured in slot F, with the point P extending perpendicularly from said bar, but however subject to being adjusted toward and from the blade G by sliding in the slot F, and it is intended that the sections V, V, and prongs $d$, $d$, shall be so bent as to clamp the bar C with sufficient tension to hold the point P from moving out of adjustment only at times when forcibly adjusted by the operator.

In use the implement is taken in the hand by grasping the handle portion B. The point P is then pressed against and caused to penetrate the tin, also by such action likewise moving the blade G, when by a twisting movement of the arm, the implement is turned causing it to turn on its point center P, and causing the blade G to move about in a circular direction, at the same time cutting the tin, and when a complete turn is made a circular section of tin will have been cut from the can.

Having thus described my invention, what

I claim as new and useful, and desire to secure by Letters Patent, is as follows:

The combination with the handle and arm portions B—D, of the slotted bar portion C, the sliding section H provided with the sections V, V, and prongs $d$—$d$—, set in said slot and carrying the point P; and the blade G punched from said bar portion, substantially as set forth.

FRANK W. WRIGHT.

Witnesses:
WM. J. HUTCHINS,
WILL C. HUTCHINS.